(12) United States Patent
Kye et al.

(10) Patent No.: US 10,723,219 B2
(45) Date of Patent: Jul. 28, 2020

(54) BAFFLE ASSEMBLY FOR PLASTIC FUEL TANK

(71) Applicant: DONG HEE INDUSTRIAL CO., LTD., Ulsan (KR)

(72) Inventors: Tae-Hong Kye, Suwon-si (KR); Do-Hyun Cho, Suwon-si (KR); Tae-Hyun Kim, Suwon-si (KR)

(73) Assignee: Dong Hee Industrial Co., Ltd., Ulsan (KR)

( * ) Notice: Subject to any disclaimer, the term of this patent is extended or adjusted under 35 U.S.C. 154(b) by 226 days.

(21) Appl. No.: 15/558,168

(22) PCT Filed: Sep. 22, 2016

(86) PCT No.: PCT/KR2016/010595
§ 371 (c)(1),
(2) Date: Sep. 13, 2017

(87) PCT Pub. No.: WO2017/052233
PCT Pub. Date: Mar. 30, 2017

(65) Prior Publication Data
US 2018/0065474 A1 Mar. 8, 2018

(30) Foreign Application Priority Data

Sep. 23, 2015 (KR) .................. 10-2015-0134379

(51) Int. Cl.
*B65D 81/00* (2006.01)
*B60K 15/03* (2006.01)
*B60K 15/077* (2006.01)

(52) U.S. Cl.
CPC ............ *B60K 15/03* (2013.01); *B60K 15/077* (2013.01); *B60K 2015/0775* (2013.01); *B60K 2015/0777* (2013.01)

(58) Field of Classification Search
CPC ...... B65D 90/53; B60K 15/03; B60K 15/077; B60K 2015/0775; B60K 2015/0777; B60K 2015/0344
(Continued)

(56) References Cited

U.S. PATENT DOCUMENTS 5,960,981 A * 10/1999 Dodson ................. B65D 90/52
220/507
9,168,830 B2 * 10/2015 Park ................. B60K 15/03177
2009/0134174 A1 5/2009 Kang et al.

FOREIGN PATENT DOCUMENTS

JP 06-045828 U 6/1994
JP 2007230307 A 9/2007
(Continued)

OTHER PUBLICATIONS

Search Report in European Patent Application No. 16848958.1 dated Aug. 27, 2018, 5 pages.
(Continued)

*Primary Examiner* — Elizabeth J Volz
(74) *Attorney, Agent, or Firm* — TraskBritt (57) ABSTRACT

A baffle assembly of this application has an assembling connector for maintaining a coupled state by means of a vertical binding force $F_{verticality}$ for locking a baffle plate, which has fluid-passing through-holes, to the side surface of a baffle body, which has fluid-passing through-holes, and lateral tightening force $F_{horizontality}$ for pressing the same, such that the baffle body and the baffle plate can be assembled in a fitted manner and, particularly, a double locking state is formed by the vertical binding force $F_{verticality}$ and the lateral tightening force $F_{horizontality}$, thereby preventing a change of the coupled state.

11 Claims, 5 Drawing Sheets

(58) Field of Classification Search
USPC .................................................. 220/564, 563
See application file for complete search history.

(56) References Cited

FOREIGN PATENT DOCUMENTS

| | | |
|---|---|---|
| JP | 2015-085915 A | 5/2015 |
| KR | 1020050046937 A | 5/2005 |
| KR | 10-2007-0062314 A | 6/2007 |
| KR | 100980627 B1 | 9/2010 |
| KR | 20110059865 | 6/2011 |
| KR | 101512932 B1 | 4/2015 |

OTHER PUBLICATIONS

International Search Report for International Application No. PCT/KR2016/010595, dated Jan. 9, 2017, 4 pages with Eng. Translation.
Written Opinion of the International Search Authority for International Application No. PCT/KR2016/010595, dated Jan. 9, 2017, 5 pages.

\* cited by examiner

BAFFLE ASSEMBLY FOR PLASTIC FUEL TANK

CROSS-REFERENCE TO RELATED APPLICATIONS

This application is a national phase entry under 35 U.S.C. § 371 of International Patent Application PCT/KR2016/010595, filed Sep. 22, 2016, designating the United States of America and published as International Patent Publication WO 2017/052233 A1 on Mar. 30, 2017, which claims the benefit under Article 8 of the Patent Cooperation Treaty to Korean Patent Application Serial No. 10-2015-0134379, filed Sep. 23, 2015.

TECHNICAL FIELD

This application relates generally to a baffle for a plastic fuel tank and, more particularly, to a baffle assembly for a plastic fuel tank in which a baffle plate having a plurality of holes is assembled with a baffle body in a fitting manner.

BACKGROUND

In general, a fuel tank is provided with a plate-shaped baffle having a predetermined length and a plurality of through holes, such that fuel (or oil) supply as well as noise reduction due to oil splashing can be efficiently performed.

In particular, a plastic fuel tank having an advantage of weight reduction compared to a steel material is formed integrally with the baffle by molding a parison in an extrusion blow molding machine during parison molding.

Thus, while the plastic fuel tank formed using the parison has an advantage in that the structure and shape of the baffle are not limited due to the ease of assembly with the fuel tank, it is difficult to precisely maintain the assembly position of the baffle during the parison molding.

To this end, the baffle is held in an accurate assembly position with the aid of a separate device, such as a baffle loading pin, a slide core, etc.

BRIEF SUMMARY

Technical Problem

However, a baffle assembly that is separated into a baffle plate having a plurality of holes, and a baffle body maintaining a baffle shape must be maintained in a stable coupled state prior to being positioned for accurate assembly using parison molding. Thus, even if a baffle loading pin, a slide core and the like are used, it is inevitably difficult to accurately maintain the assembly position.

Accordingly, this disclosure has been made keeping in mind the above problems occurring in the prior art, and an object of the disclosure is to provide a baffle assembly for a plastic fuel tank, wherein a baffle plate having a plurality of holes is coupled to the baffle body in a fitting manner at a position on a side of the baffle body, whereby a coupling position can be freely selected, and particularly double fixation is formed by a vertical binding force acting to prevent separation thereof and a lateral tightening force acting to restrain movement thereof, thereby preventing a change of the coupled state.

Technical Solution

In order to accomplish the above object, this disclosure provides a baffle assembly for a plastic fuel tank, the baffle assembly including: a baffle body having a through hole through which a fluid passes; a baffle plate having a through hole through which a fluid passes; and an assembly connector maintaining a coupled state of the baffle body and the baffle plate by forming a vertical binding force acting to lock the baffle plate to a side of the baffle body and by forming a lateral tightening force acting to press the baffle plate to the side of the baffle body.

In the preferred embodiment, the assembly connector may include an assembly pin provided at the baffle body and an assembly hole provided at the baffle plate, such that the assembly hole is fitted over the assembly pin, thereby forming the vertical binding force and the lateral tightening force. The assembly pin may protrude from an edge flange of the baffle body, and the assembly hole may be formed on an assembly surface of the baffle plate. The assembly pin may include a protruding boss protruding from the edge flange, and a pressure plate provided at an end of the protruding boss; and the assembly hole may include a vertical channel formed by cutting the assembly surface, and a contact protrusion protruding to a position adjacent to the vertical channel, wherein the vertical binding force is formed by restraining the protruding boss to the vertical channel, and the lateral tightening force is formed by bringing the pressure plate into close contact with the contact protrusion.

In the preferred embodiment, the vertical channel may include a choke neck having a width smaller than a boss thickness of the protruding boss, wherein the choke neck divides an entire length of the vertical channel into a guide path through which the protruding boss passes, and an end position where the protruding boss seats, and forms the vertical binding force by being elastically deformed by the protruding boss. The choke neck may be connected to the guide path by an inclined entrance surface, and narrows an interior space of the end position by a straight seat surface. A thickness of the choke neck may be ½ of a straight length of the seat surface.

In the preferred embodiment, the pressure plate may be spaced apart from the protruding boss by a pressurizing gap, and the contact protrusion may be spaced apart from the assembly surface by a tightening gap W-2, wherein the tightening gap is greater than the pressurizing gap to form the lateral tightening force. The contact protrusion may include a protruding contact surface protruding from the assembly surface by the tightening gap, wherein the protruding contact surface is provided at a lower portion thereof with an inclined lower surface inclined at an obtuse angle and connected to the assembly surface, and at an upper portion thereof with a straight horizontal upper surface connected to the assembly surface. A thickness of the inclined lower surface may be 1.5 times a thickness of the protruding contact surface.

In the preferred embodiment, the contact protrusion may include left and right contact protrusions provided at opposite left and right sides of the vertical channel. The left contact protrusion and the right contact protrusion may be placed on the same level line at the opposite left and right sides of the vertical channel or may be placed offset from each other at the opposite left and right sides of the vertical channel.

In the preferred embodiment, the baffle body may further include: a rib forming a grid pattern and surrounding the through hole; and an assembly position holding leg maintaining an assembly position of the baffle body in a parison. The baffle plate may further include a rib forming a grid pattern and surrounding the through hole.

Advantageous Effects

As described above, in the baffle assembly of this disclosure, the baffle plate and the baffle body can be easily coupled with each other by fitting, and particularly the baffle plate is coupled to the side of the baffle body, and thus the coupling position can be freely selected regardless of the shapes of the baffle plate and the baffle body.

Further, double fixation is formed by the vertical binding force and the lateral tightening force, and thus the baffle assembly of this disclosure can be suitable for parison molding requiring a rigid assembly state for maintaining the accurate assembly position.

DETAILED DESCRIPTION

Hereinbelow, embodiments of this disclosure will be described in detail with reference to the accompanying drawings. The scope of the disclosure is not limited to the specifically described embodiments, and various changes and modifications may be made by those skilled in the art, and such changes and modification are also included in the scope of this disclosure.

Figure 1:
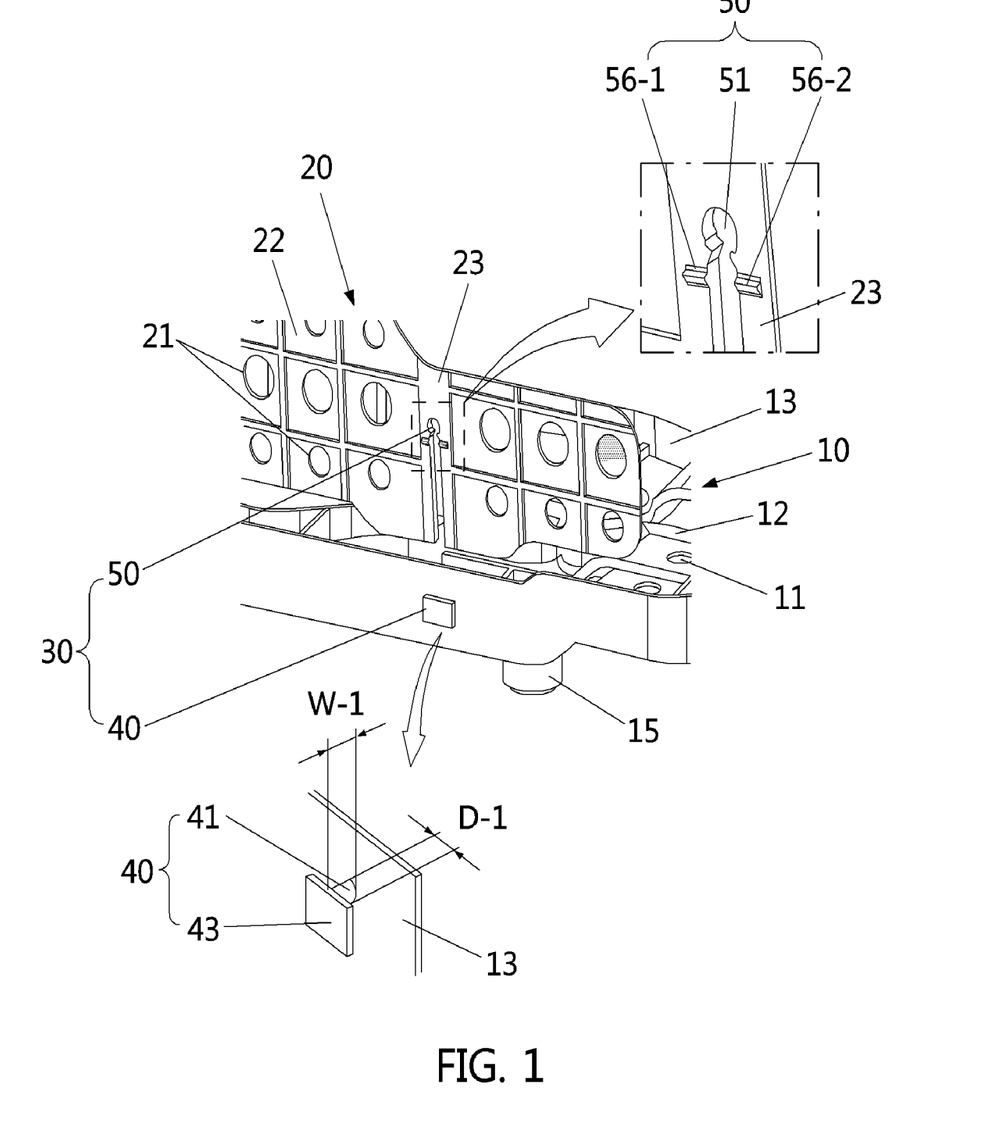
FIG. 1 is a view showing a state in which a baffle assembly for a plastic fuel tank according to this disclosure is separated into a baffle plate and a baffle body.

FIG. 1 is a view showing a baffle plate and a baffle body, in a separated state, of a baffle assembly for a plastic fuel tank according to an embodiment of the present disclosure.

As shown, the baffle assembly includes a flexible plastic baffle body 10 having a rectangular parallelepiped shape, a flexible plastic baffle plate 20 having a plate shape, and an assembly connector 30 maintaining a coupled state of the baffle plate 20 at an edge flange of the baffle body 10.

Specifically, the baffle body 10 includes a through hole 11 formed through the body and through which a fluid passes, a rib 12 protruding from a body surface and reinforcing rigidity of the body, an edge flange 13 surrounding the body and forming an edge of the body, and an assembly position holding leg 15 maintaining an assembly position of the baffle body in a parison during parison molding. In particular, the through hole 11 is provided in plural, and the rib 12 is provided as a plurality of grid shaped lines. Thus, ribs 12 form a grid pattern and surround each through hole 11. In the present embodiment, the baffle body 10 is represented as a rectangular parallelepiped shape, but it may be modified into an appropriate size and shape depending on the size and internal structure of the fuel tank to be used.

Specifically, the baffle plate 20 includes a through hole 21 formed through the plate and through which a fluid passes, a rib 22 protruding from a plate surface and reinforcing rigidity of the plate, an assembly surface 23 surrounded by ribs 22 and having no through hole 21. Particularly, although the assembly surface 23 is represented as being located at one place on the baffle plate 20, it is actually provided in plural along a length of the baffle plate 20 so as to stably maintain coupling with the baffle body 10.

Specifically, the assembly connector 30 includes an assembly pin 40 provided at the baffle body 10 and an assembly hole 50 provided at the baffle plate 20, such that the baffle plate 20 is assembled with the baffle body 10 by fitting the assembly hole 50 over the assembly pin 40. Particularly, the assembly pin 40 forms a lateral tightening force acting to press the baffle plate 20 horizontally while the assembly hole 50 forms a vertical binding force acting to restrain separation of the baffle plate 20.

For example, the assembly pin 40 includes a protruding boss 41 having a boss thickness D-1, and a plate-shaped pressure plate 43 having a pressurizing gap W-1. Here, the protruding boss 41 may have a rectangular cross section, but is assumed to be a circular cross section in the following. Particularly, the protruding boss 41 protrudes directly from the edge flange 13 of the baffle body 10, and the pressure plate 43 is provided directly at an end of the protruding boss 41, and thus they are integrally molded with the baffle body 10.

For example, the assembly hole 50 includes: a vertical channel 51 guiding the protruding boss 41 of the assembly pin 40 to be inserted into and passed therethrough, and determining an assembly position of the baffle plate 20; and left and right contact protrusions 56-1 and 56-2 protruding from opposite left and right sides of the vertical channel 51 and being in close contact with the pressure plate 43 of the assembly pin 40. Particularly, the vertical channel 51 is formed by linearly cutting the assembly surface 23 with a length that does not exceed a height of the baffle plate 20. The left contact protrusion 56-1 is placed at a first side (defined as a left side) of the vertical channel 51 of the assembly hole 50, and the right contact protrusion 56-2 is placed at a second side of the vertical channel 51 (defined as a right side), wherein the left and right contact protrusions 56-1 and 56-2 protrude directly from the assembly surface 23. Thus, the assembly hole 50 is molded integrally with the baffle plate 20 when the baffle plate 20 is molded.

Here, the left and right contact protrusions 56-1 and 56-2 are placed on the same level line at opposite sides of the vertical channel 51, but may be placed offset from each other such that the lateral tightening force by the pressure plate 43 is widely distributed.

Figure 2:
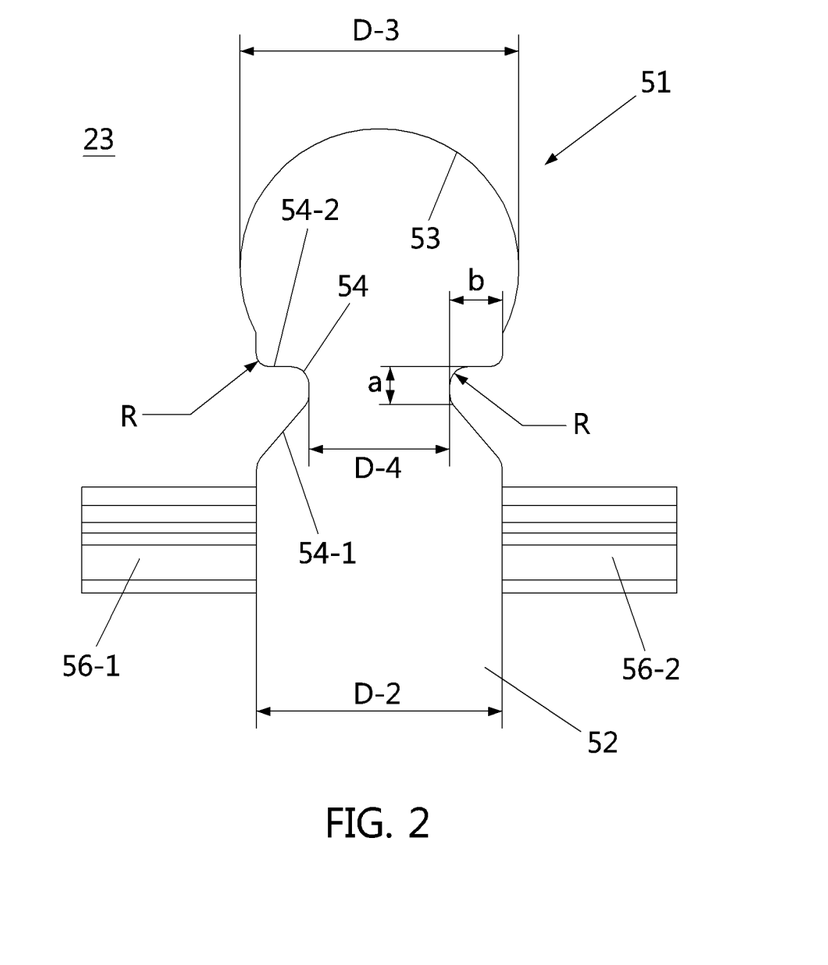
FIG. 2 is a view showing an example of a vertical binding force formation structure of the baffle plate according to this disclosure.

Meanwhile, FIG. 2 shows a structure in which the vertical channel 51 of the assembly hole 50 forms a vertical binding force with the assembly pin 40.

As shown, the vertical channel 51 includes a guide path 52 formed by linearly cutting the assembly surface 23 of the baffle plate 20, an end position 53 forming an end portion of the guide path 52, and a choke neck 54 forming a section where the guide path 52 and the end position 53 are connected to each other. In particular, the choke neck 54 is elastically deformed in the process of moving the protruding boss 41 of the assembly pin 40 to the end position 53 via the guide path 52, and then is elastically restored after the protruding boss 41 is seated in the end position 53, thereby forming a vertical binding force. In particular, the choke neck 54 is connected to the guide path 52 by an entrance surface 54-1 inclined at about 45 degrees, such that the elastic deformation by the protruding boss 41 can proceed smoothly, a straight seat surface 54-2 narrows an interior space of the end position 53 such that the restraint on the protruding boss 41 can be more stably maintained, and a thickness a is determined to be ½ of a straight length b such that durability of the choke neck 54 can be maintained when the elastic deformation is caused by introduction of the protrusion boss 41.

Further, a junction of the guide path 52 and the entrance surface 54-1, a junction of the end position 53 and the seat surface 54-2, and a junction of the entrance surface 54-1 and the seat surface 54-2 are rounded, such that the protruding boss 41 moves without interruption.

In particular, the guide path 52 forms a guide width D-2, the end position 53 forms an end width D-3, and the choke neck 54 forms a neck width D-4. The guide width D-2 and the end width D-3 are equal to or larger than the boss thickness D-1 of the protruding boss 41 of the assembly pin 40 while the end width D-3 is smaller than the boss thickness D-1.

Figure 3:
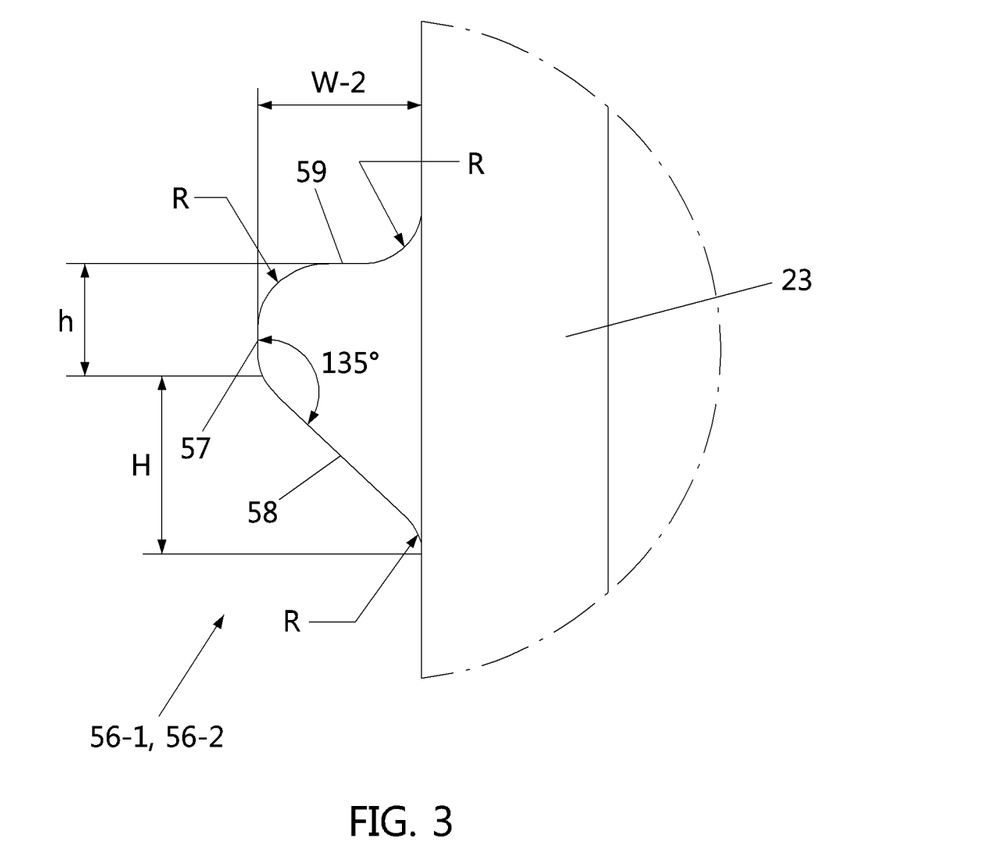
FIG. 3 is a view showing an example of a lateral tightening force of the baffle plate according to this disclosure.

Meanwhile, FIG. 3 shows a structure in which the left and right contact protrusions 56-1 and 56-2 of the assembly hole 50 form a lateral tightening force with the assembly pin 40.

As shown, each of the left and right contact protrusions 56-1 and 56-2 includes a protruding contact surface 57 protruding from the assembly surface 23 by a tightening gap W-2, wherein the tightening gap W-2 is greater than the pressurizing gap W-1 of the pressure plate 43 of the assembly pin 40. Thus, a difference between the tightening gap W-2 and the pressurizing gap W-1 causes the elastic deformation of the pressure plate 43 by the protruding contact surface 57, and the pressure plate 43 is brought into close contact with the protruding contact surface 57, thereby forming a lateral tightening force. Here, the difference between the tightening gap W-2 and the pressurizing gap W-1 is set within an elastic deformation limit of the pressure plate 43, and varies depending on the material of the pressure plate 43.

Further, the protruding contact surface 57 is provided at a lower portion thereof with an inclined lower surface 58 inclined at about 135° from the protruding contact surface connected to the assembly surface 23, and the protruding contact surface 57 is provided at an upper portion thereof with a straight horizontal upper surface 59 connected to the assembly surface 23.

Particularly, when a thickness of the protruding contact surface 57 is h and a thickness of the inclined lower surface 58 is H, the thickness H is set to approximately 1.5 times the thickness h, such that durability of the protruding contact surface 57 is maintained under the action of the lateral tightening force by the pressure plate 43.

Figure 4:
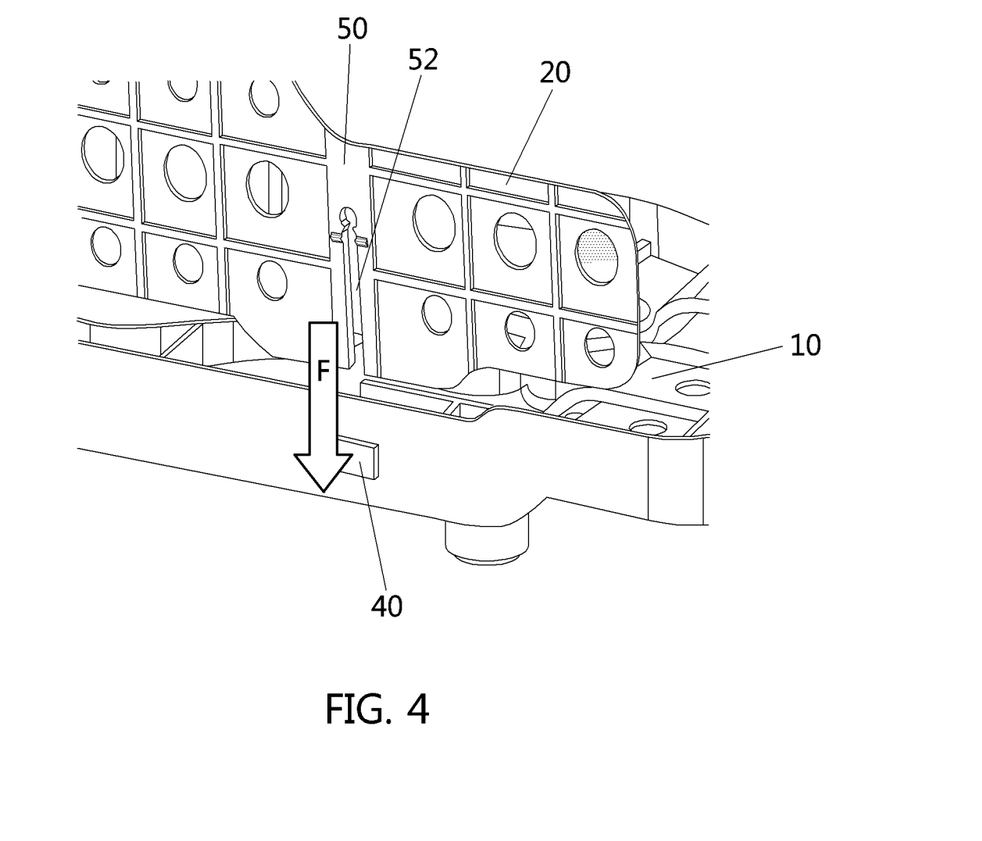
FIG. 4 is a view showing a state in which the baffle plate according to the the disclosure is assembled to a baffle body.
Figure 5:
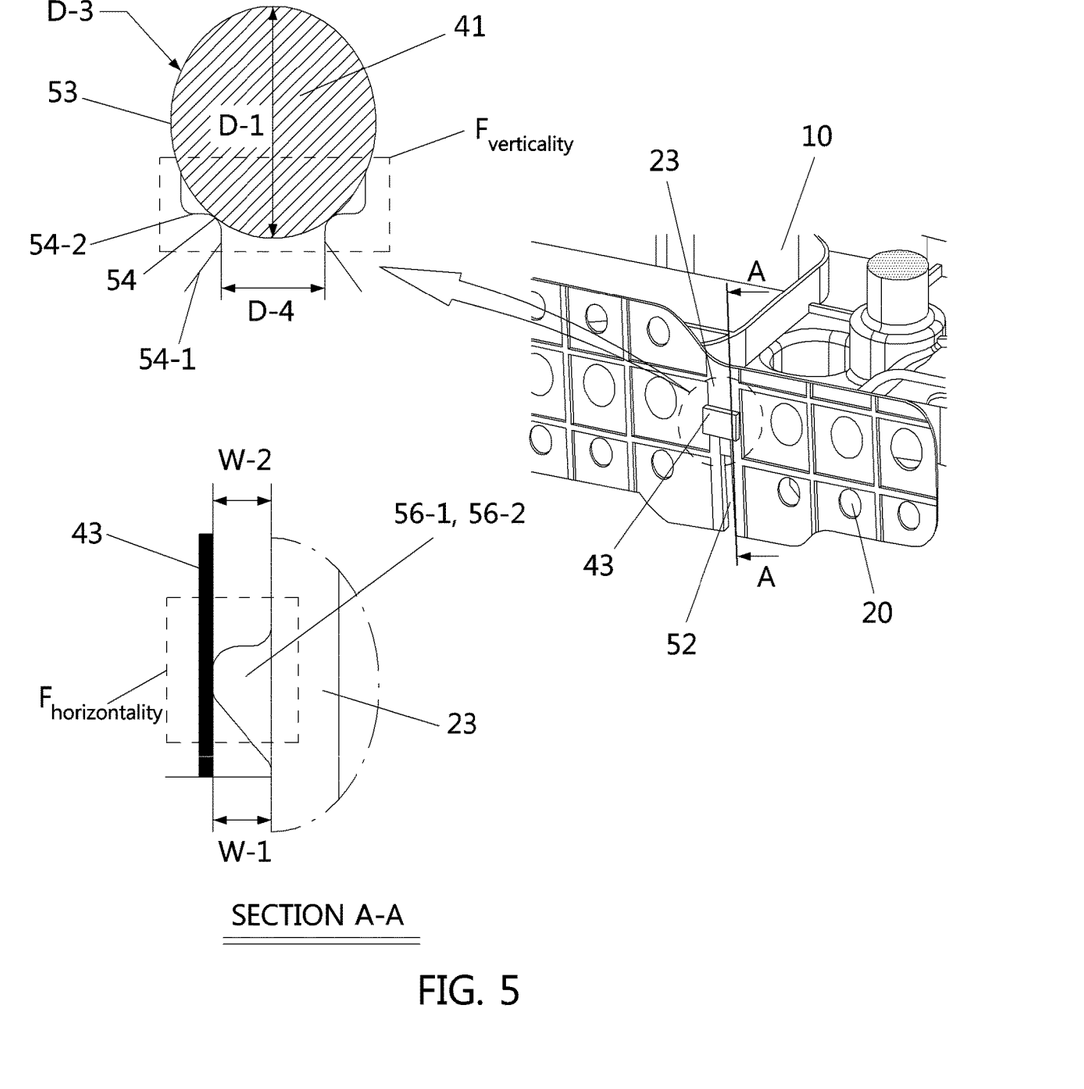
FIG. 5 is a view showing a state in which the baffle plate according to this disclosure is fitted to the baffle body to complete a baffle assembly.

Meanwhile, FIGS. 4 and 5 show an assembling operation of the baffle body 10 and the baffle plate 20 and a coupled state thereof after the assembling operation, respectively.

Referring to FIG. 4, assembly of the baffle assembly is simply performed by aligning the assembly hole 50 of the baffle plate 20 with the assembly pin 40 of the baffle body 10 and then pressing the baffle plate 20 with a predetermined force F.

Here, the force F acting to press the baffle plate 20 is determined such that the protruding boss 41 of the assembly pin 40 passes through the vertical channel 51 and the choke neck 54 is elastically deformed, and thus the protruding boss 41 can be positioned at the end position 53. In this case, the elastic deformation of the choke neck 54 by the protruding boss 41 serves to allow an operator to directly feel completion of the assembly of the baffle plate 20 and the baffle body 10.

Referring to FIG. 5, a vertical binding force $F_{verticality}$ and a lateral tightening force $F_{horizontality}$ of the assembly pin 40 and the assembly hole 50 acting for coupling the baffle plate 20 to the baffle body 10 are illustrated.

For example, a vertical binding force $F_{verticality}$ is formed by supporting the protruding boss 41 positioned at the end position 53 on the seat surface 54-2 of the choke neck 54. Particularly, the choke neck 54 has a neck width D-4 smaller than the boss thickness D-1 of the protruding boss 41, such that the restraint on the protruding boss 41 is stably secured. Here, the protruding boss 41 is represented by a circular shape in cross section but may have a rectangular shape in cross section.

For example, a lateral tightening force $F_{horizontality}$ is formed by bring the pressure plate 43 provided at an end of the protruding boss 41 into close contact with the protruding contact surfaces 57 of the left and right contact protrusions 56-1 and 56-2. Particularly, since the pressurizing gap W-1 of the pressure plate 43 is smaller than the tightening gap W-2 of the protruding contact surface 57, the pressure plate 43 can be in tight contact with the protruding contact surface 57, thereby preventing the baffle plate 20 from deviation. Thus, the coupled state of the baffle plate 20 and the baffle body 10 can be rigidly maintained.

Thus, the assembled baffle body 10 and the baffle plate 20 can be stably maintained in the coupled state due to double fixation formed by the vertical binding force $F_{verticality}$ and the lateral tightening force $F_{horizontality}$ of the assembly connector 30.

As described above, the baffle assembly according to the present embodiment includes an assembly connector (not shown) that maintains the coupled state with the vertical binding force $F_{verticality}$ acting to lock the baffle plate 20 having the fluid-passing through hole 21 to the side of the baffle body 10 having the fluid-passing through hole 11, and with the lateral tightening force $F_{horizontality}$ acting to press the baffle plate. Thus, the baffle body 10 and the baffle plate 20 can be assembled in a fitting manner. In particular, the vertical binding force $F_{verticality}$ and the lateral tightening force $F_{horizontality}$ form the double fixation, thereby preventing a change in the coupled state.

The invention claimed is:

1. A baffle assembly for a plastic fuel tank, the baffle assembly comprising:
    a baffle body having a through hole through which a fluid passes;
    a baffle plate having a through hole through which a fluid passes; and
    an assembly connector including an assembly pin provided with a pressure plate provided at an end of a protruding boss protruding from the baffle body, and an assembly hole provided with a contact protrusion protruding to a position adjacent to a vertical channel formed by cutting the baffle plate, the assembly connector maintaining a coupled state of the baffle body and the baffle plate such that when the assembly hole is fitted over the assembly pin, a vertical binding force is formed by restraining the protruding boss to the vertical channel such that the baffle plate is locked to a side of the baffle body, and a lateral tightening force is formed by bringing the pressure plate into close contact with the contact protrusion such that the baffle plate is pressed to the side of the baffle body,
    wherein the contact protrusion includes left and right contact protrusions provided at opposite left and right sides of the vertical channel;
    wherein the vertical channel includes a choke neck having a width smaller than a boss thickness of the protruding boss; and
    wherein the choke neck divides an entire length of the vertical channel into a guide path through which the protruding boss passes and an end position where the protruding boss seats, and forms the vertical binding force by being elastically deformed by the protruding boss.

2. The baffle assembly of claim 1, wherein the assembly pin protrudes from an edge flange of the baffle body, and the assembly hole is formed on an assembly surface of the baffle plate.

3. The baffle assembly of claim 1, wherein the choke neck is connected to the guide path by an inclined entrance surface, and narrows an interior space of the end position by a straight seat surface.

4. The baffle assembly of claim 3, wherein a thickness of the choke neck is ½ of a straight length of the seat surface.

5. The baffle assembly of claim 1, wherein the pressure plate is spaced apart from the protruding boss by a pressurizing gap, and the contact protrusion is spaced apart from the assembly surface by a tightening gap, wherein the tightening gap is greater than the pressurizing gap to form the lateral tightening force.

6. The baffle assembly of claim 5, wherein the contact protrusion includes a protruding contact surface protruding from the assembly surface by the tightening gap, wherein the protruding contact surface is provided at a lower portion thereof with an inclined lower surface inclined at an obtuse angle and connected to the assembly surface, and at an upper portion thereof with a straight horizontal upper surface connected to the assembly surface.

7. The baffle assembly of claim 6, wherein a thickness of the inclined lower surface is 1.5 times a thickness of the protruding contact surface.

8. The baffle assembly of claim 1, wherein the left contact protrusion and the right contact protrusion are placed on the same level line at the opposite left and right sides of the vertical channel.

9. The baffle assembly of claim 8, wherein the left contact protrusion and the right contact protrusion are placed offset from each other at the opposite left and right sides of the vertical channel.

10. The baffle assembly of claim 1, wherein the baffle body further includes: a rib forming a grid pattern and surrounding the through hole; and an assembly position holding leg maintaining an assembly position of the baffle body in a parison.

11. The baffle assembly of claim 1, wherein the baffle plate further includes a rib forming a grid pattern and surrounding the through hole.

* * * * *